(12) United States Patent
Harden et al.

(10) Patent No.: US 9,471,412 B2
(45) Date of Patent: Oct. 18, 2016

(54) ENCODING DIAGNOSTIC DATA IN AN ERROR MESSAGE FOR A COMPUTER PROGRAM

(71) Applicant: INTERNATIONAL BUSINESS MACHINES CORPORATION, Armonk, NY (US)

(72) Inventors: Arron J. Harden, Milton Keynes (GB); Richard K. Morris, Milton Keynes (GB)

(73) Assignee: International Business Machines Corporation, Armonk, NY (US)

(*) Notice: Subject to any disclaimer, the term of this patent is extended or adjusted under 35 U.S.C. 154(b) by 68 days.

(21) Appl. No.: 14/050,585

(22) Filed: Oct. 10, 2013

(65) Prior Publication Data

US 2014/0129882 A1 May 8, 2014

(30) Foreign Application Priority Data

Nov. 5, 2012 (GB) .................................. 1219824.8

(51) Int. Cl.
*G06F 11/00* (2006.01)
*G06F 11/07* (2006.01)

(52) U.S. Cl.
CPC ........ *G06F 11/0766* (2013.01); *G06F 11/0718* (2013.01); *G06F 11/0769* (2013.01); *G06F 11/0772* (2013.01)

(58) Field of Classification Search
CPC ........... G06F 11/0766; G06F 11/0769; G06F 11/0718; G06F 11/0772; G06F 11/327; G06Q 20/3276
See application file for complete search history.

(56) References Cited

U.S. PATENT DOCUMENTS

| 7,380,214 | B1 | 5/2008 | Giormov |
| 2004/0078734 | A1 | 4/2004 | Deuter |
| 2008/0270842 | A1* | 10/2008 | Ho et al. .................. 714/42 |
| 2010/0225653 | A1* | 9/2010 | Sao et al. .................. 345/520 |
| 2010/0325490 | A1* | 12/2010 | Anvin et al. .................. 714/37 |
| 2012/0131416 | A1* | 5/2012 | Dugan et al. .................. 714/760 |
| 2012/0304089 | A1* | 11/2012 | Cohen .................. 715/764 |
| 2013/0166969 | A1* | 6/2013 | Zhang et al. .................. 714/57 |
| 2014/0034721 | A1* | 2/2014 | Gadepalli et al. .................. 235/375 |

(Continued)

FOREIGN PATENT DOCUMENTS

| EP | 2267599 A1 | 12/2010 |
| JP | 2003186704 A | 7/2003 |

(Continued)

OTHER PUBLICATIONS

Anonymous, "Create a Specific QR Code From Product Error Messages That Could Be Scanned Into a Device and Used for Support", ip.com, IPCOM000199891D, Sep. 20, 2010, pp. 1-2.
IBM, "Method and System for Intelligent Error Messages", ip.com, IPCOM000172942D, Jul. 21, 2008, pp. 1-5.
UK IPO, GB Application No. GB1219824.8, Search Report and Examination Opinion mailed Mar. 25, 2013, pp. 1-5.

*Primary Examiner* — Philip Guyton
(74) *Attorney, Agent, or Firm* — Law Office of Jim Boice

(57) ABSTRACT

A method, system, and/or computer program product encodes diagnostic data in an error message for a computer program. In response to an error in the processing of a computer program, a predetermined set of diagnostic data associated with the error is selected. The predetermined set of diagnostic data is encoded in an image, and the image is displayed in association with an error message for the error.

16 Claims, 4 Drawing Sheets

(56) References Cited

U.S. PATENT DOCUMENTS

2014/0036299 A1* 2/2014 Norota .................. 358/1.14
2014/0082430 A1* 3/2014 Bartlett et al. ........... 714/47.3

FOREIGN PATENT DOCUMENTS

JP    2009026226 A    2/2009
JP    2009140204 A    6/2009

* cited by examiner

ENCODING DIAGNOSTIC DATA IN AN ERROR MESSAGE FOR A COMPUTER PROGRAM

This application is based on and claims the benefit of priority from United Kingdom (GB) Patent Application 1219824.8, filed on Nov. 5, 2012, and herein incorporated by reference in its entirety.

BACKGROUND

The present invention relates to encoding diagnostic data in an error message for a computer program.

In a computer system running one or more application programs, errors in the processing of the application programs may occur. The occurrence of an error is communicated to a user by an error message displayed in an error message window. The error message is commonly communicated to a support organization for the application program by sending a screen shot that includes the displayed error message. The error message may display a summary of the error or optionally a full report. However, the summary of the error is seldom sufficient to diagnose the fault whereas the full report is often too long to display in full within the error message window and is thus truncated in the screen shot provided to the support organization. Furthermore, while a full report may be generated separately and sent to the support organization, the extra steps required for the user to perform this task often result in the task not being performed or only being performed with significant delay.

SUMMARY

In one embodiment of the present invention, a method, system, and/or computer program product encodes diagnostic data in an error message for a computer program. In response to an error in the processing of a computer program, a predetermined set of diagnostic data associated with the error is selected. The predetermined set of diagnostic data is encoded in an image, and the image is displayed in association with an error message for the error.

In one embodiment of the present invention, a method extracts diagnostic data associated with an error in a computer program. Image data encoding a set of diagnostic data is received. The set of diagnostic data is associated with an error in a computer program, and the set of diagnostic data is encoded in accordance with a predetermined encoding method. The set of diagnostic data from the image data is decoded in accordance with the predetermined encoding method, and a set of diagnostic data is stored together with a record of the error.

BRIEF DESCRIPTION OF THE SEVERAL VIEWS OF THE DRAWINGS

Illustrative embodiments of the invention will now be described, by way of example only, with reference to the following drawings in which.

DETAILED DESCRIPTION

As described herein in one embodiment, a system communicates diagnostic data associated with an error in the processing of a computer program, wherein the diagnostic data is encoded in an image prior to its communication.

Figure 1:
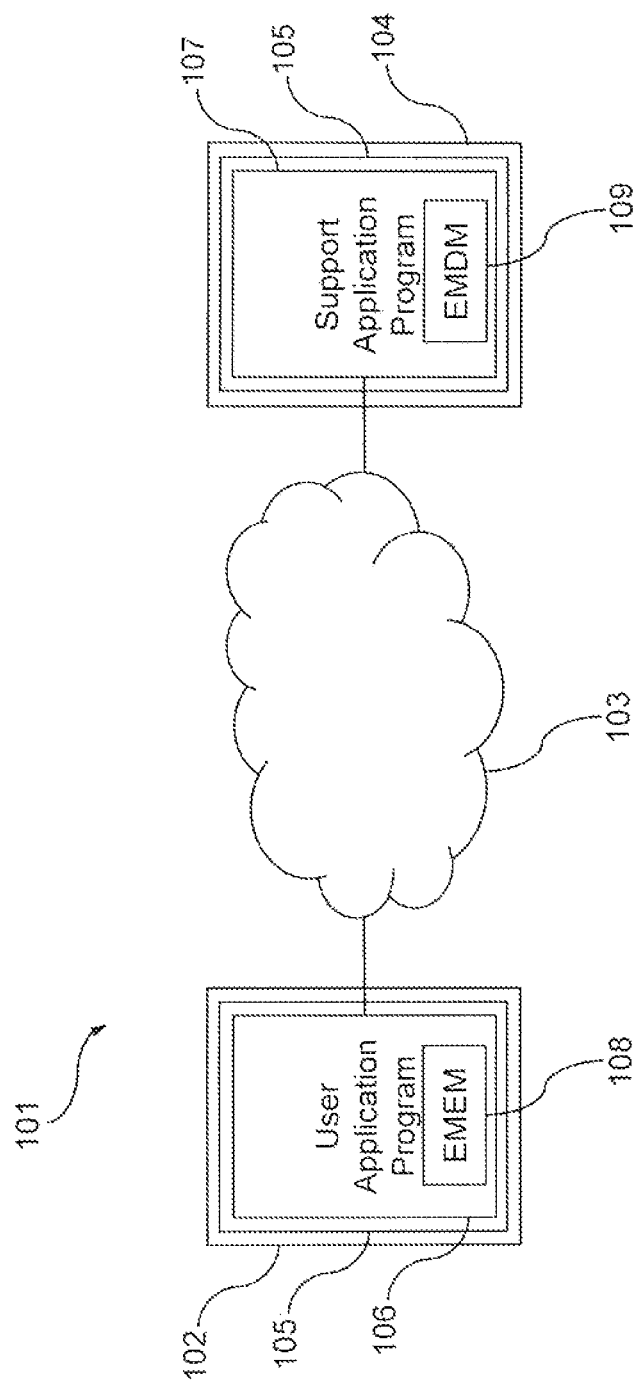
FIG. 1 is a schematic representation of a computer system comprising a first and second application programs.

With reference now to the figures, and particularly to FIG. 1, a computer system 101 comprises a first computer 102 connected over a network 103 to a second computer 104. The first and second computers are each running an operating system 105 arranged to provide a platform for running one or more application programs. The operating system 105 running on the first computer 103 is a window-based operating system.

The first computer 102 is running a user application program 106 and the second computer is running a support application program 107. The user application program 106 comprises an error message encoding module 108 which is arranged, in response to the occurrence of an error in the processing of the user application program 106, to select a predetermined set of the diagnostic data associated with the error, encode the set of diagnostic data in an image and display the image to the user in association with an error message for the error. The error message and associated image encoding the set of diagnostic data are captured as a screen shot and the screen shot image communicated over the network 103 to the support application program 107.

In the present embodiment the support application program 107 is arranged to receive the error message and associated image encoding the set of diagnostic data within the screen shot. The image is identified within the received screen shot and then decoded to retrieve the set of diagnostic data. The set of diagnostic data is then stored in associated with a record of the error so as to enable subsequent diagnosis of the cause of the original error in the processing of the user application 106.

Figure 2:
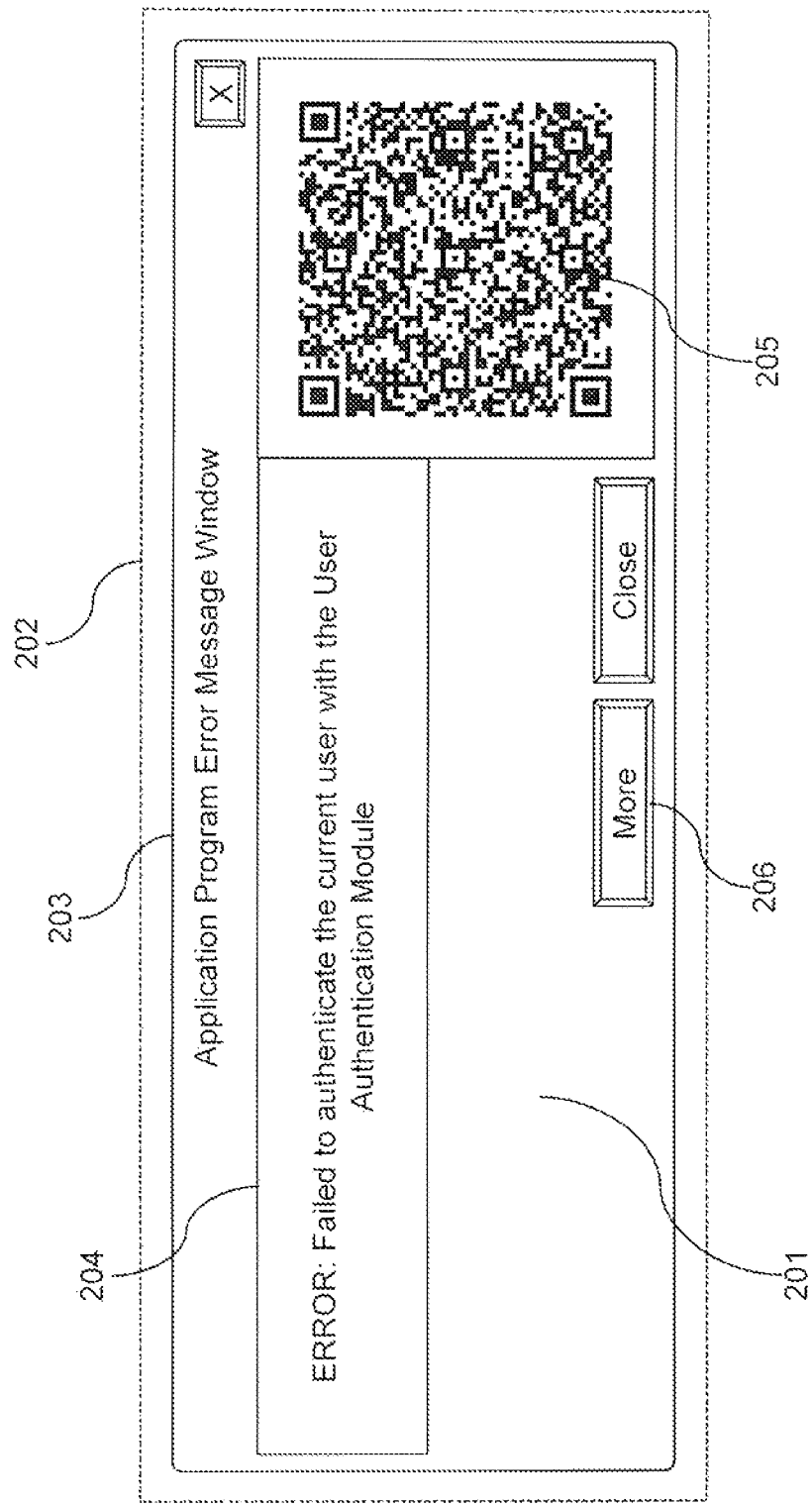
FIG. 2 is a schematic representation of an error message produced by the first application program of FIG. 1.

With reference to FIG. 2, an error message 201 for the application program 106 is displayed on a display device 202 of the first computer 102 in a window 203. The error message 201 comprises an error message 204 and an image 205 encoding the set of diagnostic data associated with the error. The set of diagnostic data (not shown) may be displayed by the user by clicking the "More" button 206. In the present embodiment, the image 205 comprises a two dimensional code in the form of a matrix code such as a Quick Response™ (QR™) type code.

In the present embodiment, the selected set of diagnostic data comprises the following information from the first computer 102, operating system 105 and user application program 106:

System configuration data such as central processing unit (CPU) specification, memory specification, operating system type (OS) and language;

Product configuration such as application program version, the component or sub-component which produced the error, an instance identifier;

The or each error message produced by the first computer 102, operating system 105 and user application program 106; and A computer program stack trace comprising the location within the user application program 106 where the error occurred.

In the present embodiment, the selected set of diagnostic data is compressed prior to its encoding in the image 205 so as to enable as much diagnostic data as possible to be provided with a given image 205. The error message encoding module 108 is arranged to use a lossless compression algorithm such as the LZ (Lempel Ziv) algorithm. For example, a version 40 QR image can encode up to 2953 bytes of binary data. Therefore, a compression ratio of 0.33 for the LZ algorithm enables approximately 9000 bytes of diagnostic data to be encoded in a single image 205. The compressed set of diagnostic data is then encoded in the image 205 in accordance with the encoding method for the two dimensional code, such as the QR code encoding method.

In the present embodiment, the screen shot comprising the error message 201 for communication to the support application program 107 is created using a lossless image capture and storage format. In the present embodiment the screen shot is communicated to the support application program 107 in a bitmap image format in the form of a Portable Network Graphics (PNG) file. As noted above, on receipt of the screen shot comprising the error message 201 the support application program 107 is arranged to identify the image 205 within the bitmap image of the error message 201. The image 205 is then decoded in accordance with the appropriate decoding method to produce the compressed set of diagnostic data. The compressed set of diagnostic data is then decompressed using the appropriate lossless decompression method to provide the set of diagnostic data. The set of diagnostic data is then stored for subsequent diagnosis of the error in the user application program 106.

Figure 3:
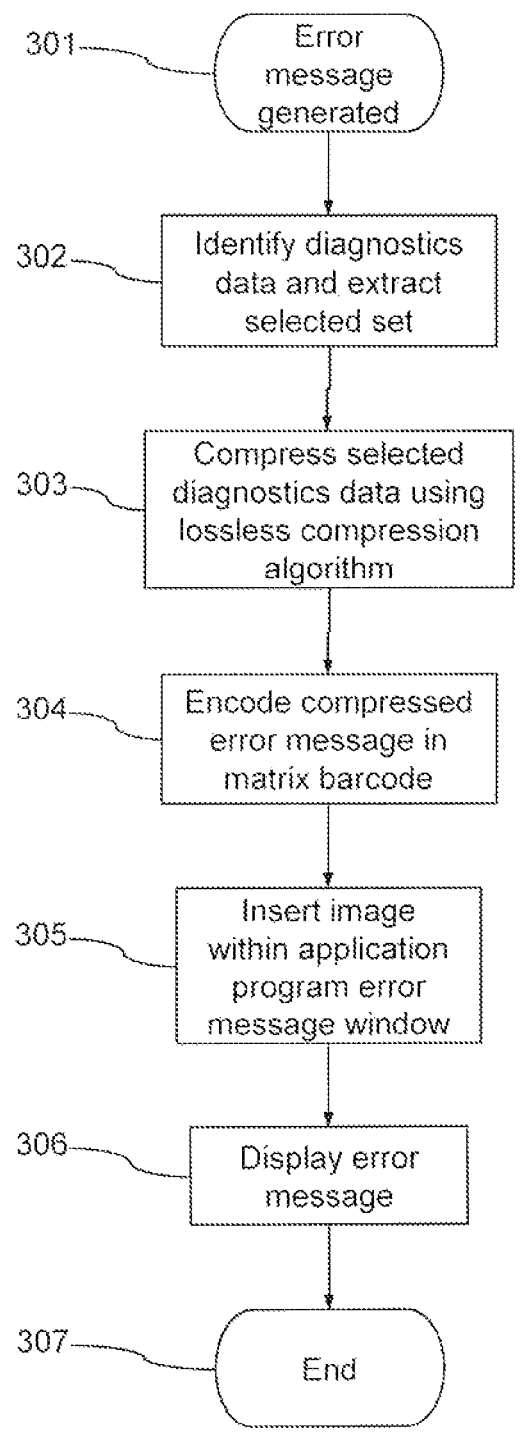
FIG. 3 is a flow chart illustrating processing performed in the first application program for encoding diagnostic data in the error message of FIG. 2.

The processing performed by the error message encoding module 108 in response to the production of an error message by the user application program 106 will now be described with reference to FIG. 3. Processing is initiated at step 301 in response to the production of an error message and processing moves to step 302. At step 302 the relevant set of diagnostic data is determined and processing moves to step 303. At step 303 the selected set of diagnostic data is compressed using a lossless compression method and processing move to step 304. At step 304 the compressed diagnostic data is encoded in an image 205 in the form of a two-dimensional code such as a matrix barcode and processing moves to step 305. At step 305 the image 205 encoding the diagnostic data is inserted into the error message window 203 so as to be fully visible within the window 203 on the display 202 and processing moves to step 306. At step 306 the error message 201 is displayed on the display 202.

As noted above, in the present embodiment, in response to the display of the error message 201, the user is then prompted to take a screen shot and communicate the saved screen image to the support application program 107.

Figure 4:
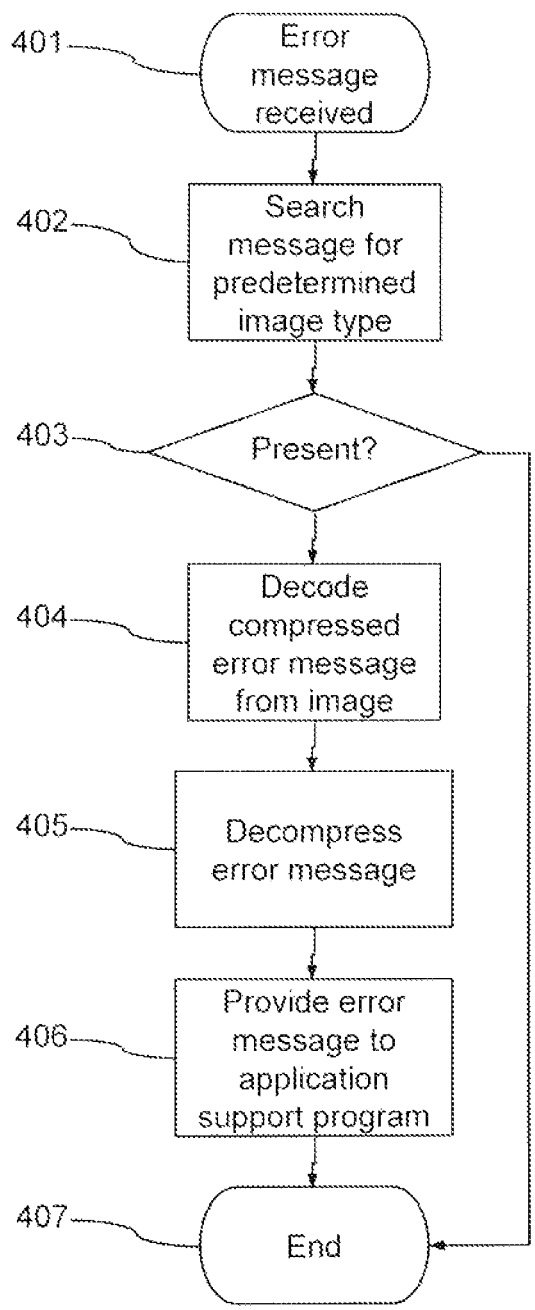
FIG. 4 is a flow chart illustrating processing performed in the second application program for decoding diagnostic data from the error message of FIG. 2.

The processing performed by the error message decoding module 109 in response to the production of an error message by the support application program 107 will now be described with reference to FIG. 4. Processing is initiated at step 401 in response to the receipt of an error message screen shot and processing moves to step 402. At step 402 the screen shot image is searched for a relevant image 205 and processing moves to step 403. At step 403 if a relevant image 205 is identified then processing moves to step 404. At step 404 the identified image 205 is decoded in accordance with the decoding method for the relevant two-dimensional code and processing moves to step 405. At step 405 the compressed diagnostic data decoded from the image 205 is decompressed in accordance with the relevant decompression method and processing moves to step 406. At step 406 the selected set of diagnostic data for the error message 201 is provided to the support application program 107 for subsequent use in diagnosing the cause of the error. Processing then moves to step 407 and ends. If at step 403 no image 205 is identified in the received screen shot then processing also moves to step 407 and ends.

In another embodiment the screen shot, comprising the error message and associated image encoding the set of diagnostic data, is taken automatically in response to the production of the error message. The screen shot is saved in a suitable lossless image format for transmission to the support application program. The saved screen shot may be sent to the support application program automatically or under user control. The user may be prompted to send the automatically saved screen shot. In a further embodiment, the screen shot comprises only the image encoding the set of diagnostic data. In another embodiment, the screen shot comprises only the error message window.

In a further embodiment, the error message window is sized so as to ensure that the image encoding the set of diagnostic data is displayed in full. In another embodiment, the size or shape of the image encoding the set of diagnostic data is modified in accordance with the size of the error message window to ensure that the image encoding the set of diagnostic data is displayed in full. In a further embodiment a plurality of images are used to encode the set of diagnostic data.

As will be understood by those skilled in the art, the image format used for encoding the set of diagnostic data may be any suitable image encoding method or format depending on a given application. The image may comprise a matrix code, multi-dimensional code of any suitable shape, size or capacity. The diagnostic data may be encrypted at the image file, image data or diagnostic data level.

As will be understood by those skilled in the art, the capacity of the image encoding format will be selected to provide sufficient capacity for all relevant sets of selected diagnostic data expected from application program. Such data sets may not necessarily be compressed.

As will be understood by those skilled in the art, the functionality or logic of the error message encoding or decoding modules may be provided at any suitable point in the computer system such as within the relevant application programs, as standalone programs or as part of the operating system.

Embodiments of the invention ensure that the whole of the selected set diagnostic data is provided in the error message window thus improving the accuracy and efficiency of the error message production functionality of the application program. Furthermore, encoding of the diagnostic data in an image improves the transmission performance and accuracy for the data. Communicating the encoded set of diagnostic data in an image bitmap format reduces data loss for even for larger/data dense images.

As described herein, one embodiment of the invention provides a method for encoding diagnostic data in an error message for a computer program, the method comprising the steps of: in response to an error in the processing of a computer program selecting a predetermined set of diagnostic data associated with the error; encoding the set of diagnostic data in an image; and displaying the image in association with an error message for the error.

Embodiments of the invention ensure that the selected set diagnostic data is provided in the error message window thus improving the accuracy and efficiency of the error message production functionality of the application program. Furthermore, encoding of the diagnostic data in an image improves the transmission performance and accuracy for the data.

The image may comprise a two dimensional code. The image may comprise a matrix code. The diagnostic data may be compressed before being encoded in the image. The diagnostic data may be compressed using a lossless compression method. The image comprising the diagnostic data may be communicated to a diagnostic program for use in diagnosing the cause of the error wherein the diagnostic program is arranged to automatically extract the diagnostic data from the image. The image communicated to the diagnostic program may comprise a lossless copy of the image comprising the diagnostic data as displayed. The diagnostic data may comprise system configuration data or program configuration data or an error message or a stack trace for the computer program. The diagnostic data may be encoded in a plurality of images. The image comprising the diagnostic data may be arranged to be fully displayed.

Communicating the encoded set of diagnostic data in an image bitmap format reduces data loss even for larger, data dense images.

Another embodiment provides a method for extracting diagnostic data associated with and error for a computer program, the method comprising the steps of: receiving image data encoding a set of diagnostic data associated with an error in a computer program wherein the set of diagnostic data is encoded in accordance with a predetermined encoding method; decoding the set of diagnostic data from the image data in accordance with the predetermined encoding method; and storing the set of diagnostic data in association with a record of the error.

The image data encoding a set of diagnostic data may be provided within a larger image and the method comprises the step of identifying the image data encoding a set of diagnostic data within the larger image prior to decoding the set of diagnostic data. The diagnostic data may be encrypted.

A further embodiment provides apparatus for encoding diagnostic data in an error message for a computer program, the apparatus being operable to: select a predetermined set of diagnostic data associated with the error in response to an error in the processing of a computer program; encode the set of diagnostic data in an image; and display the image in association with an error message for the error.

Another embodiment provides a computer program stored on a computer readable medium and loadable into the internal memory of a digital computer, comprising software code portions, when said program is run on a computer, for performing a method for encoding diagnostic data in an error message for a computer program, the method comprising the steps of: in response to an error in the processing of a computer program selecting a predetermined set of diagnostic data associated with the error; encoding the set of diagnostic data in an image; and displaying the image in association with an error message for the error.

A further embodiment provides a method or system substantially as described with reference to the figures.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

What is claimed is:

1. A method for encoding and displaying diagnostic data related to an error message for a computer program, the method comprising:
    in response to an error in processing of a computer program, selecting, by one or more processors, a predetermined set of diagnostic data associated with the error;
    encoding, by one or more processors, the predetermined set of diagnostic data in an image;
    displaying, by one or more processors, the image that represents the encoded predetermined set of diagnostic data simultaneously with a text error message that describes the error, wherein the image and the text error message are displayed together on a same user interface;
    displaying, by one or more processors, a "More" button on the user interface, wherein activating the "More" button causes the predetermined set of diagnostic data to be displayed on the user interface;
    receiving, by one or more processors, an activation input for the "More button" from the user interface; and
    in response to receiving the activation input for the "More button", displaying the predetermined set of diagnostic data on the user interface.

2. The method of claim 1, wherein the image comprises a two dimensional code.

3. The method of claim 1, wherein the image comprises a matrix code.

4. The method of claim 1, further comprising:
    compressing, by one or more processors, the predetermined set of diagnostic data into compressed diagnostic data; and
    encoding, by one or more processors, the compressed diagnostic data into the image.

5. The method of claim 4, wherein the predetermined set of diagnostic data is compressed using a lossless compression method.

6. The method of claim 4, further comprising:
    communicating, by one or more processors, the image encoded with the compressed diagnostic data to a diagnostic program for use in diagnosing a cause of the error, wherein the diagnostic program automatically extracts the predetermined set of diagnostic data from the image.

7. The method of claim 6, wherein the image encoded with the compressed diagnostic data communicated to the diagnostic program comprises a lossless copy of the image, wherein the lossless copy of the image comprises the predetermined set of diagnostic data as displayed.

8. The method of claim 1, wherein the predetermined set of diagnostic data comprises system configuration data that includes a central processing unit (CPU) specification, a memory specification, and an operating system type (OS) for a computer on which the computer program is executing.

9. The method of claim 1, wherein the predetermined set of diagnostic data is encoded in a plurality of images.

10. The method of claim 1, wherein the image comprising the predetermined set of diagnostic data is fully displayed.

11. The method of claim 1, wherein the image is a two-dimensional matrix barcode, and wherein the method further comprises:
    encrypting, by one or more processors, the predetermined set of diagnostic data to create an encrypted set of diagnostic data; and encoding, by one or more processors, the encrypted set of diagnostic data into the two-dimensional matrix barcode.

12. The method of claim 1, wherein the predetermined set of diagnostic data comprises a location within the computer program where the error occurred.

13. A computer program product for encoding diagnostic data in an error message for a computer program, the computer program product comprising a non-transitory computer readable storage medium having program code embodied thereon, the program code being readable and executable by a processor to perform a method comprising:

in response to an error in processing of a computer program, selecting a predetermined set of diagnostic data associated with the error;

encoding the predetermined set of diagnostic data in an image;

displaying the image together with an error message for the error;

displaying a "More" button on the user interface, wherein activating the "More" button causes the predetermined set of diagnostic data to be displayed on the user interface;

receiving an activation input for the "More button" from the user interface; and in response to receiving the activation input for the "More button", displaying the predetermined set of diagnostic data on the user interface.

14. The computer program product of claim 13, wherein the image comprises a two dimensional code.

15. The computer program product of claim 13, wherein the image comprises a matrix code.

16. The computer program product of claim 13, wherein the method further comprises:

compressing the predetermined set of diagnostic data into compressed diagnostic data; and encoding the compressed diagnostic data into the image.

* * * * *